(12) United States Patent
Chen et al.

(10) Patent No.: US 6,347,010 B1
(45) Date of Patent: Feb. 12, 2002

(54) PERISCOPE USING COMMON OPTICAL PATH TO HAVE STABILIZED PANORAMIC VIEW

(75) Inventors: Ping-Ho Chen, Hsin-Chu; Yung-Shung Hung, Taoyuan Hsien; Jiun-Woei Huang; Ding-Tin Lin, both of Taipei; Chin-Kuan Luo, Hsin-Chu Hsein, all of (TW)

(73) Assignee: Chung-Shan Institute of Science and Technology, Taoyuan Hsien (TW)

( * ) Notice: Subject to any disclaimer, the term of this patent is extended or adjusted under 35 U.S.C. 154(b) by 0 days.

(21) Appl. No.: 09/685,863

(22) Filed: Oct. 10, 2000

(51) Int. Cl.[7] .......................... G02B 23/08; G02B 23/22
(52) U.S. Cl. ....................................... 359/402; 359/403
(58) Field of Search ................................. 359/402, 403, 359/404, 405, 406

(56) References Cited

U.S. PATENT DOCUMENTS

| 4,572,625 | A | * | 2/1986 | Arndt et al. ................ 356/4.01 |
| 4,964,724 | A | * | 10/1990 | Ritchie ........................ 356/152 |
| 5,022,723 | A | * | 6/1991 | Schmidt et al. ............. 359/355 |
| 6,020,994 | A | * | 2/2000 | Cook ........................... 359/365 |

* cited by examiner

*Primary Examiner*—Cassandra Spyrou
*Assistant Examiner*—Mark A. Robinson
(74) *Attorney, Agent, or Firm*—Fitch, Even, Tabin & Flannery

(57) ABSTRACT

A periscope has an IR sight corresponding to the infrared light split from the optical splitters; a visible camera corresponding to the visible light split from the optical splitters; and a laser range finder corresponding to the laser beam for emitting and receiving the laser beam. The three different light beams are integrated to share a common optical path by means of a prism so as to reduce the size and the cost.

10 Claims, 6 Drawing Sheets

PERISCOPE USING COMMON OPTICAL PATH TO HAVE STABILIZED PANORAMIC VIEW

BACKGROUND OF THE INVENTION

1. Field of the Invention

The present invention relates to a periscope, and more particularly to a periscope having IR (infrared) rays, a laser beam and visible light going through the same optical path, being split by a prism and then being received by separate receivers. The periscope reduces the parts to control the optical path of different elements to reduce the cost of the periscope.

2. Description of Related Art

Normally enclosed military vehicles, such as tanks and submarines, are equipped with a periscope to gather useful information without risking exposure to personnel inside the vehicle. The periscope includes a CCD camera, an IR sight and a laser range finder, all of which have independent elements with respect to each other, and each has its own optical path. Therefore, the periscope is very large and expensive. Furthermore, due to the line of sight of each of the aforementioned elements being different from each other, extra equipment is added to calculate and adjust the parallax error, which causes time delay. The delay might be crucial in modern warfare, and the overall weight of the vehicle will also cause the vehicle to move much more slowly.

To overcome the shortcomings, the present invention tends to provide an improved periscope to mitigate and obviate the aforementioned problems.

SUMMARY OF THE INVENTION

The main objective of the invention is to provide an improved periscope that integrates the different optical paths of the IR sight, the laser range finder and the CCD camera to reduce the overall elements used in the periscope and the cost for making the same.

Another objective of the invention is to use a parabolic reflection mirror and non-spherical mirror to shorten the optical path in the periscope, so that the entire size of the periscope is be reduced.

Still another objective of the invention is to use an IR imager, a CCD sight device and a laser reflection polarized beam splitter to regulate different light beams so they can share a common optical path and reduce the elements in the periscope.

A further objective of the invention is to allow the incidence surface mirror and the incidence window to rotate 360° to easily provide a panoramic view regardless of platform yawing motion.

A still further objective of the invention is to drive the elevation axis of the incidence surface mirror by semiangle so as to have attitude stabilization in the elevation movement.

Other objects, advantages and novel features of the invention will become more apparent from the following detailed description when taken in conjunction with the accompanying drawings.

DETAILED DESCRIPTION OF PREFERRED EMBODIMENT

Figure 1B:
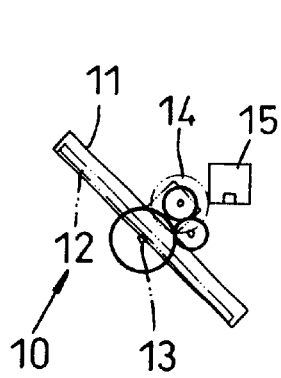
FIG. 1B is a side plan view of the elevation device in the periscope in FIG. 1A.
Figure 1A:
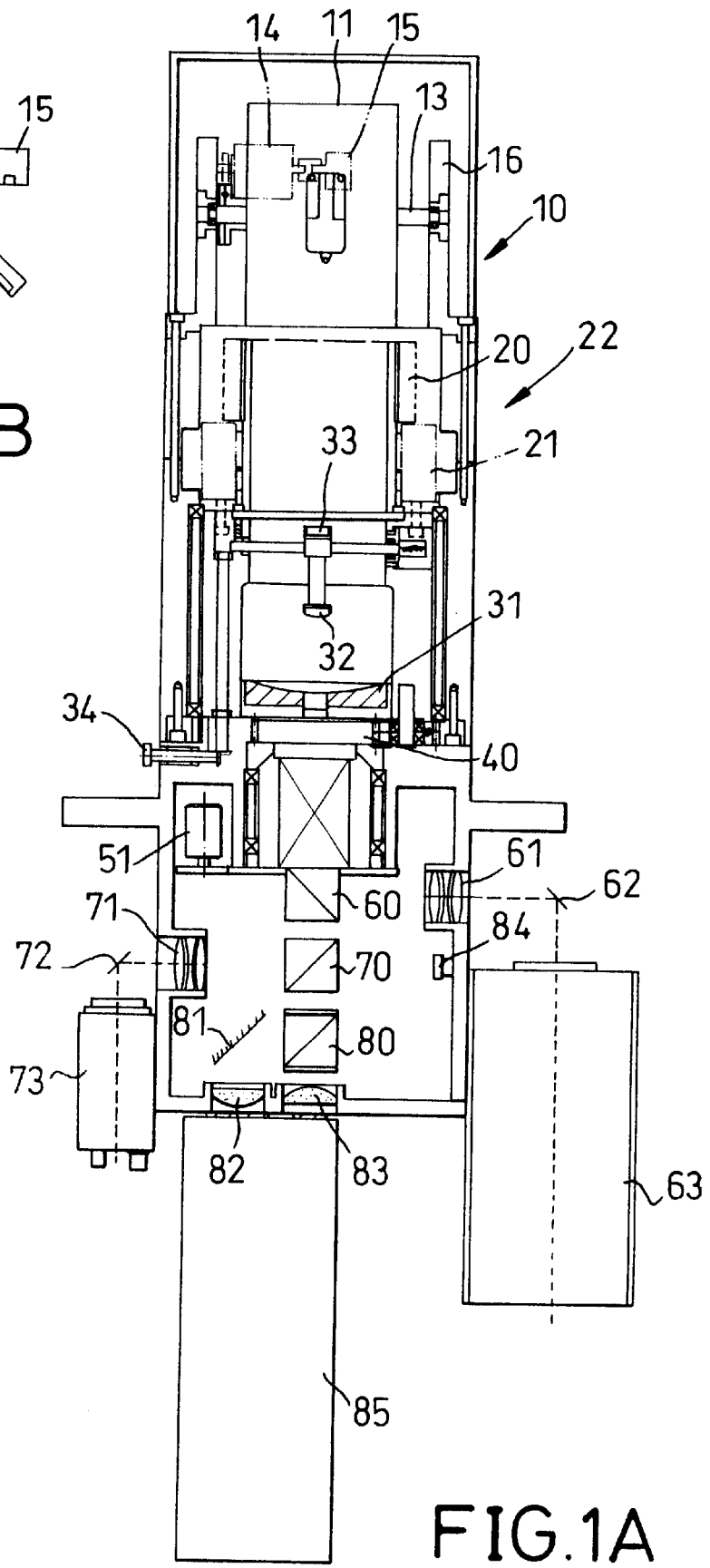
FIG. 1A is a cross sectional side plan view of the periscope in accordance with the present invention.

With reference to FIG. 1A, the periscope of the invention has (from top to bottom) an incidence surface mirror seat (11), a panoramic azimuth module (22), a magnifier (33), a field reflection module (FRM), a crosshair (40), a derotation prism (50), an azimuth resolver (51), an IR imager (63), a CCD camera (73) and a laser ranger finder (85). The incidence surface mirror seat (11) is supported by the incidence bracket (16) and controlled by the stabilized elevation mechanism (10). The panoramic azimuth module (22) comprises a slip ring (20) and a rotation-driving servo motor (21). The rotation-driving servo motor (21) rotates the incidence surface mirror seat (11) 360° to obtain a panoramic view. The field reflection module (FRM) is composed of a parabolic reflection mirror (31) and a field magnifier (32). The IR sight device comprises an IR beam splitter (60), an IR relay lens (61), an IR reflection mirror (62) and an IR imager (63). The CCD sight device comprises a visible light splitter (70), a second relay lens (71), a visible light reflection mirror (72) and a CCD camera (73). The laser range device comprises a laser reflection polarized beam splitter (80), a laser reflection mirror (81), a filter (82) and a laser ranger finder (85).

With reference to FIG. 1B, the stabilized elevation mechanism (10) has an elevation servo motor (14) located at the rear of the incidence surface mirror seat (11). The elevation servo motor (14) drives the elevation axis (13) of the incidence surface mirror seat (11) and the incidence surface mirror (12) on the incidence surface mirror seat (11) to adjust the elevation angle of the incidence surface mirror seat (11). A gyroscope (15) at the rear of the elevation mechanism (10) senses the elevation tilting rate of the elevation mechanism (10) to feedback the information to the elevation control loop. The movement in elevation of the incidence surface mirror seat (11) is driven counter semiangle by the elevation servo motor (14).

Figure 2:
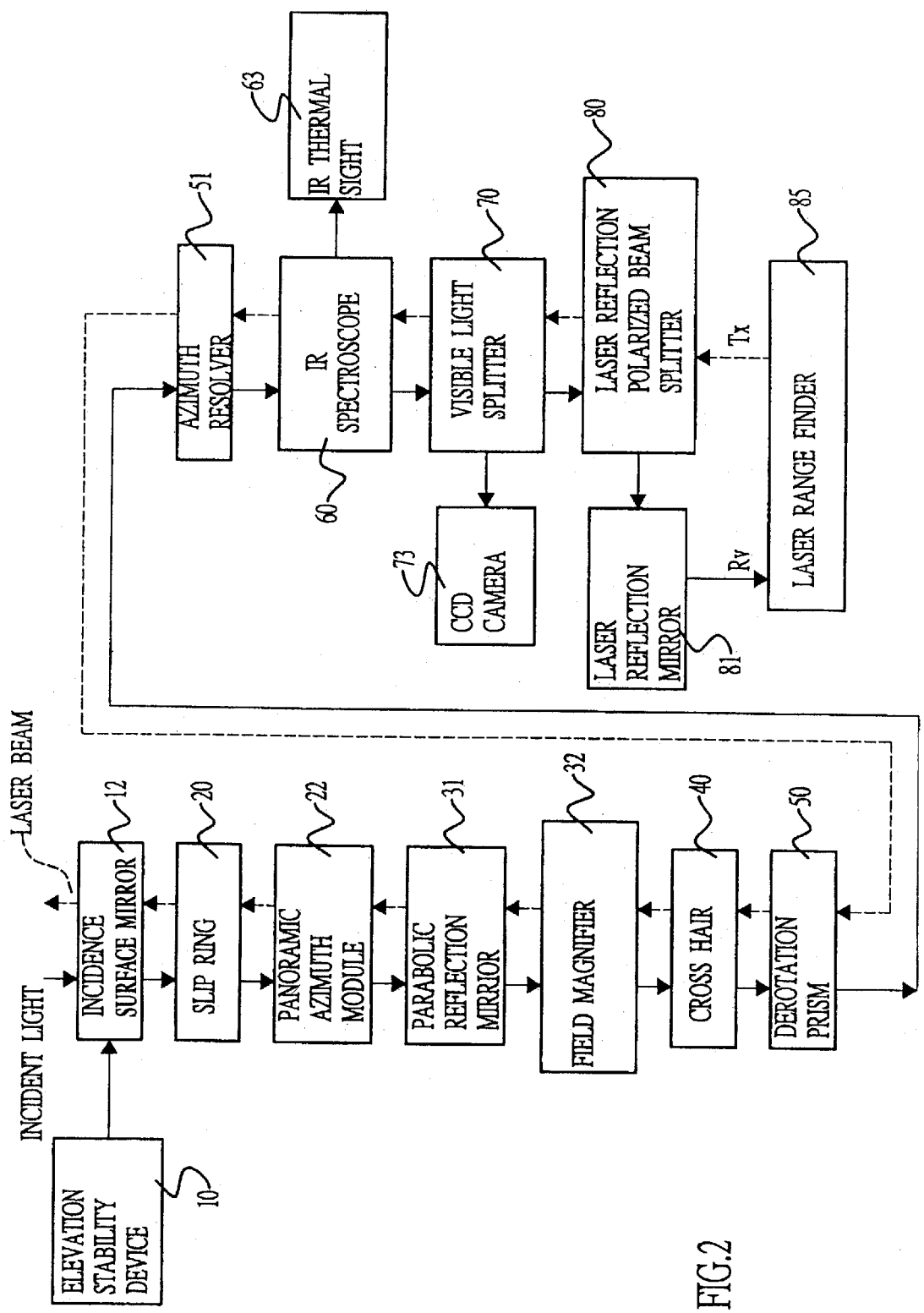
FIG. 2 is a block diagram of the structure of the periscope in FIG. 1A.

With reference to FIG. 2 and referring to FIG. 1A, when the light from the object to be detected impinges upon the incidence surface mirror (12), it also impinges upon the panoramic azimuth module (22). When the incidence surface mirror seat (11) is driven by the azimuth servo motor (21) to rotate along the slip ring (20), the azimuth resolver (51) reads out the rotation angle. Then the image is reflected by the parabolic reflection mirror (31) to the field magnifier (32) or the magnifier (33) and reflected back through the crosshair (40). Afterwards, the image passes through the derotation prism (50) to keep the image from rolling due to azimuth rotation. The image is then appropriately split by the IR beam splitter (60), the visible light splitter (70) and the laser reflection polarized beam splitter (80) to separate different light beams by their wave band and polarization in order to allow the IR imager (63), the CCD camera (73) and the laser range finder (85) to obtain the necessary and precise information. The outgoing light beam indicated by the dashed line in FIG. 2 is the laser beam from the laser range finder (85), and the laser beam absorbent (84) on the right of the visible light splitter (70) in FIG. 1A is provided to absorb the unnecessary laser beam.

When the incidence lens seat (11) is driven by the azimuth servo motor (21) to rotate along the slip ring (20), the azimuth resolver (51) reads out the rotation angle. Then the image is reflected by the parabolic lens (31) to the field magnifier (32) or the magnifier (33) and reflected back through the crosshair (40). Afterwards, the image passes through the derotation prism (50) to keep the image from rolling due to azimuth rotation. The image is then appropriately split by the IR beam splitter (60), the visible light splitter (70) and the laser reflection polarized beam splitter (80) to separate different light beams by their wave band and polarization in order to allow the IR imager(63), the CCD camera (73) and the laser range finder (85) to obtain the necessary and precise information. The outgoing light beam indicated by the dashed line in FIG. 2 is the laser beam from the laser range finder (85), and the laser beam absorbent (84) on the right of the visible light splitter (70) in FIG. 1A is provided to absorb the unnecessary laser beam.

Figure 3:
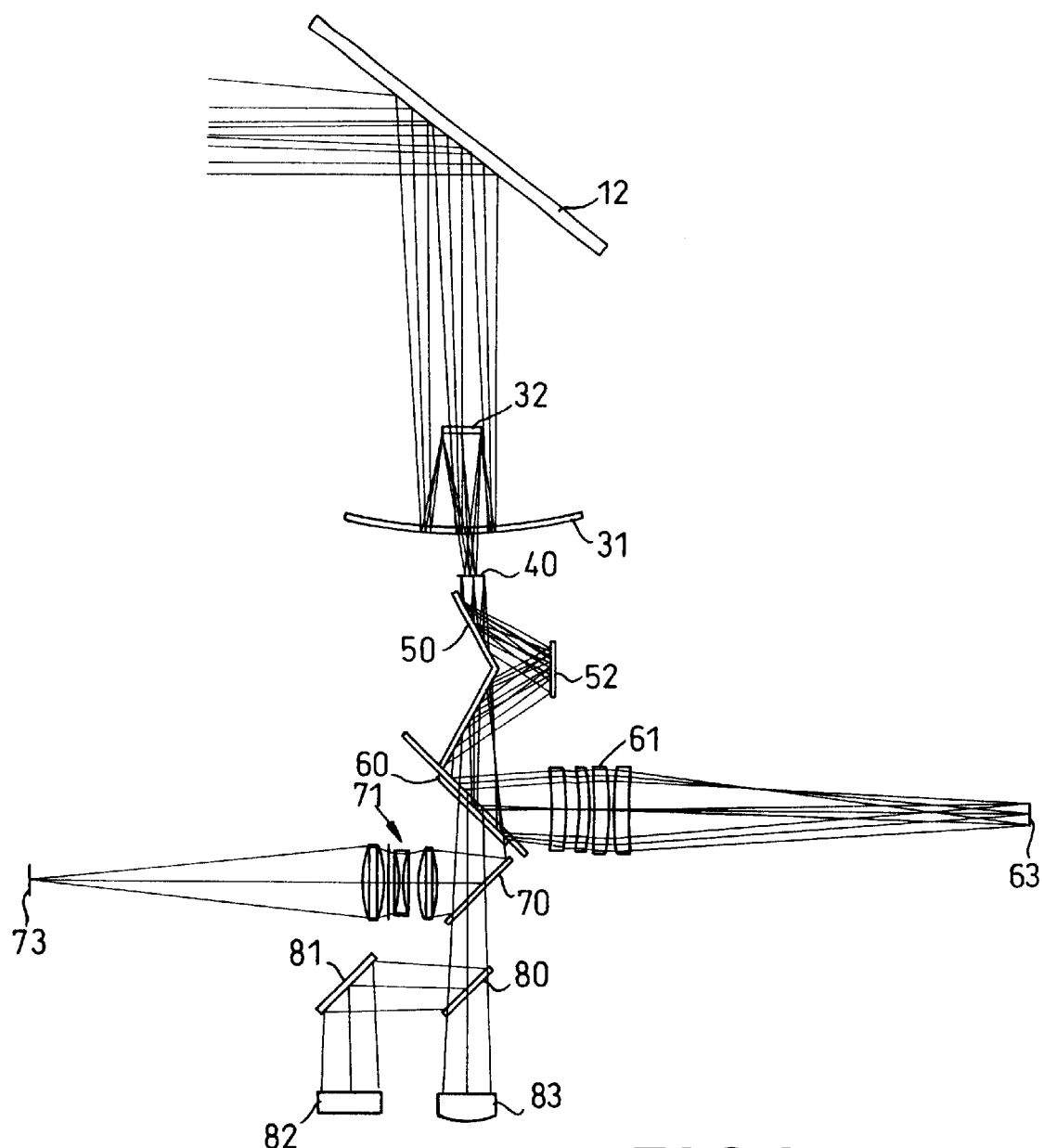
FIG. 3 is a ray trace simulation of the optical path of the periscope in FIG. 1A.

With reference to FIG. 3, the common optical path is reflected from the parabolic reflection mirror (31) to the field magnifier (32) and projected to the crosshair (40) and is processed by the derotation prism (50). Eventually, the common optical path is separated by the IR beam splitter (60), the visible light splitter (70) and the laser reflection polarized beam splitter (80) to receive laser return by the polarization.

Figure 4:
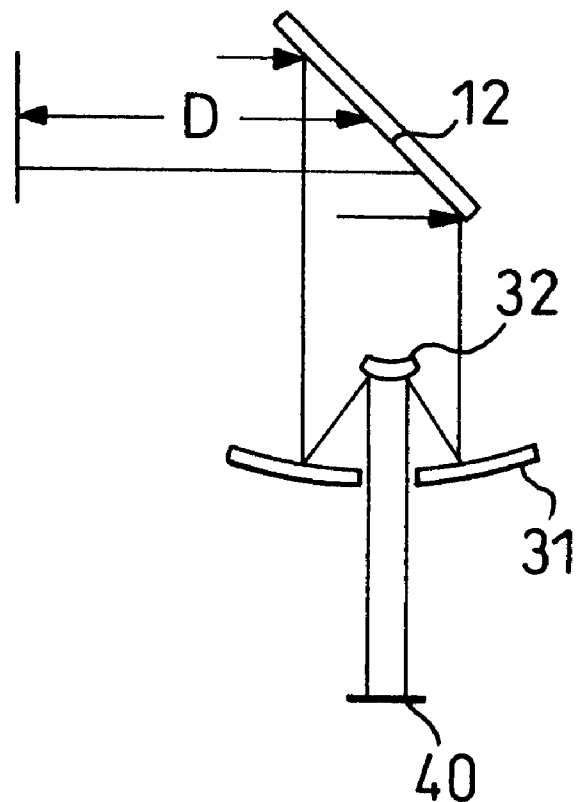
FIG. 4 is a ray trace showing the optical path through the field reflection module in the periscope in FIG. 1A.

Still, with reference to FIG. 4, the folded optical path between the parabolic reflection mirror (31) and the field magnifier (32) reduces the size of the periscope. The adjustment of the distance between the parabolic reflection mirror (31) and the field magnifier (32) will result in the adjustment of the field of view.

Figure 5A:
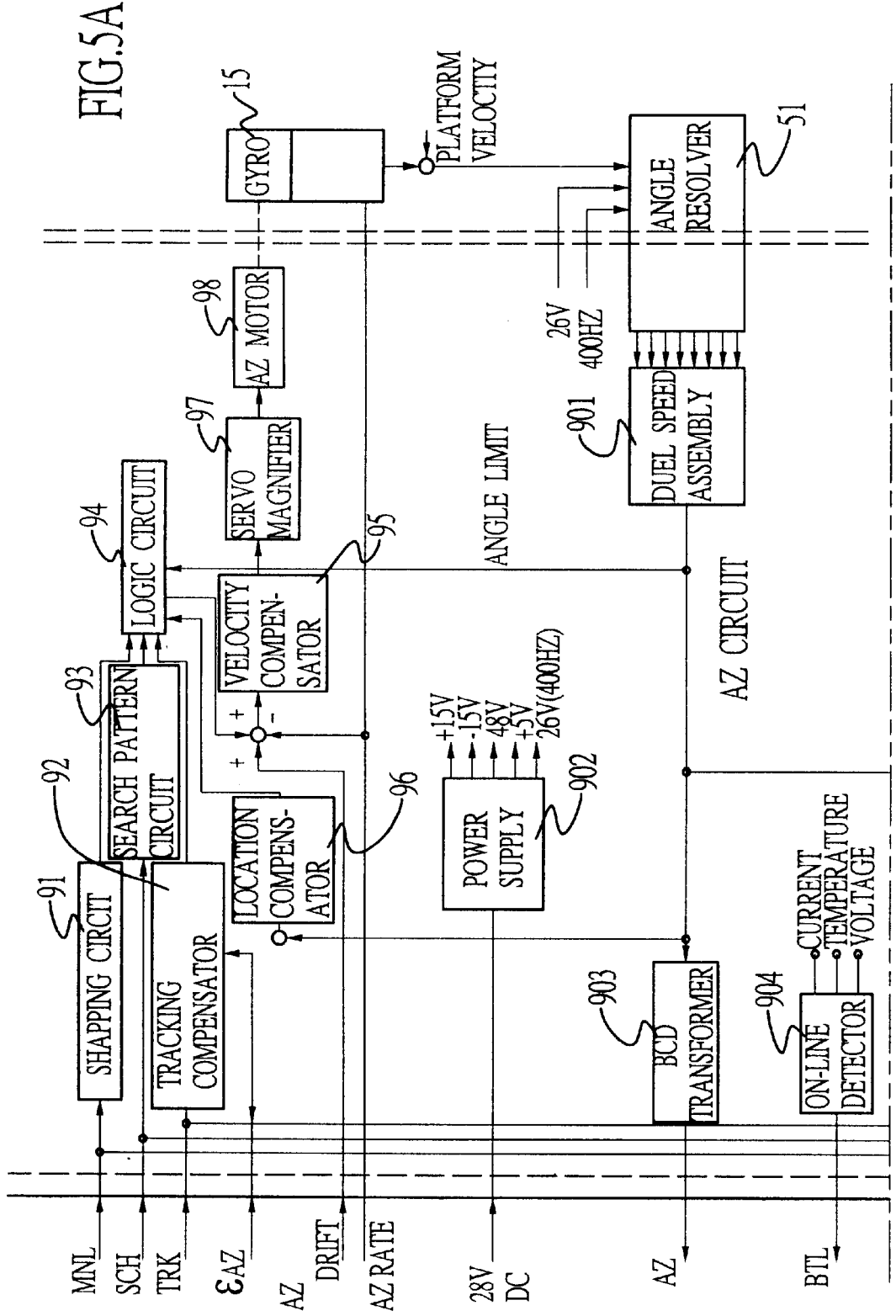
FIGS. 5A and 5B are circuit block diagrams of the periscope of the invention.
Figure 5B:
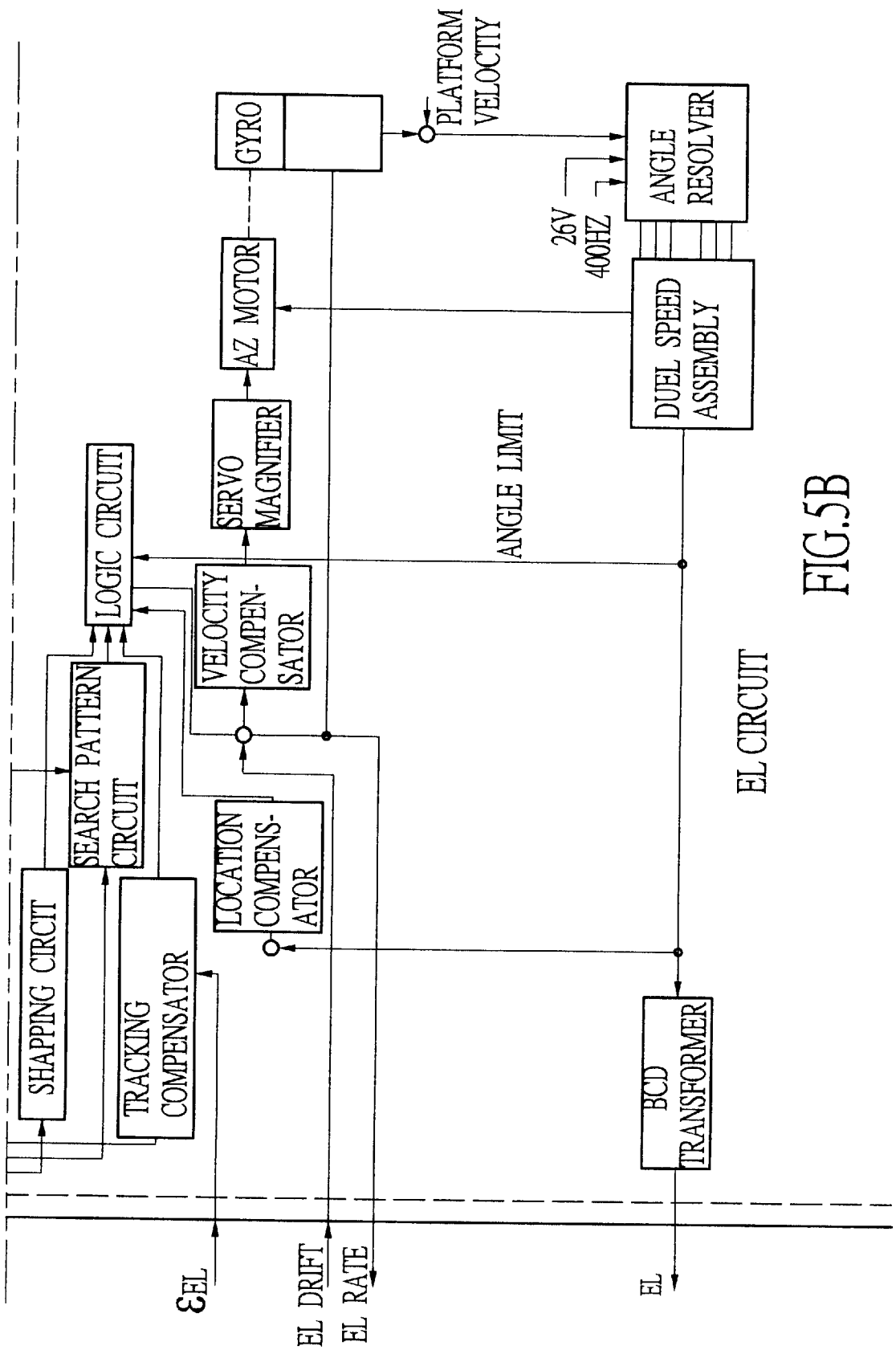

With reference to FIGS. 5A and 5B, the control circuit block diagrams of the invention generally is divided into two parts, an AZ (azimuth) circuit block and an EL (elevation) circuit block. These two kinds of circuit clocks are basically the same, the difference lies in that one outputs an AZ position signal and the other outputs an EL position signal. These two different signals will be further processed by other circuits to transfer to spherical coordinates. Since these processes and transformation are not the subject of the invention, detailed description is not included.

Due to the similarity of azimuth and elevation circuit blocks, only one will be described. With reference to the AZ circuit block in the upper portion of FIG. 5A, the input signal will be processed and transformed by the shaping circuit (91), the tracking compensator (92) and search pattern circuit (93). After the transformation, the signal is judged by the logic circuit (94) that controls the rotation of the AZ motor (98) by means of the velocity compensator (95) and the servo amplifier (97). The rate gyro (15) will sense angular rate and feedback to the velocity compensator (95) to generate a new control signal to drive the AZ motor (98) so as to acquire platform position from space integral. The platform position is sensed by the angle resolver (51) and processed by dual speed combiner (901) and the BCD converter (903) (Binary to Decimal) to transform the signal into BCD code and output from the AZ terminal for calculation of the spherical coordinates. An on-line detector (904) for detection of abnormal current, temperature and voltage is added in the circuit to provide warning for the entire system.

The present invention has the following advantages:

1. three-in-one; the CCD camera, the IR sight and the laser range finder are integrated into one piece of equipment such that the size and the cost are thus reduced.

2. common optical path; different light beams share the same optical path so that the Line-of-Sight (LOS) is common, does not require parallax correction and therefore better precision is retained.

3. multiple reflection to reduce the size of the periscope; the parabolic reflection mirror and the field magnifier fold the optical path, so that the entire length of the periscope is reduced.

4. stabilized, panoramic view; the incidence surface mirror seat is able to rotate 360° freely by the AZ motor regardless of platform yawing motion.

5. stabilized EL views; incident light of 90° angular range in EL to be scanned by EL motor is stabilized in level independent of platform EL tilt.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A periscope using a common optical path to have a stabilized panoramic view, the periscope comprising:
   an incidence surface mirror for receiving an incident light;
   a panoramic azimuth module for allowing the incidence surface mirror to rotate 360° to have the stabilized panoramic view;
   a reflection module for folding the optical path so as to reduce the overall length of the periscope;
   at least three optical splitters each arranged sequentially according to different optical paths to split different light beams, including an IR beam splitter to split IR light, a visible light splitter to split visible light, and a laser beam polarized splitter to split laser beam light, and accordingly output from different terminals;
   an IR sight corresponding to the infrared light split from the IR beam splitter;
   a visible camera corresponding to the visible light split from the visible light splitter; and
   a laser range finder corresponding to the laser beam for emitting and receiving from the laser beam polarized splitter.

2. The periscope as claimed in claim 1, wherein the reflection module is composed of a parabolic reflection mirror and a field magnifier.

3. The periscope as claimed in claim 2, wherein the field magnifier is a non-spherical mirror.

4. The periscope as claimed in claim 1, further comprising an incidence surface mirror seat controlled by stabilized elevation and azimuth devices to acquire the elevation angle and azimuth angle of the seat respectively.

5. The periscope as claimed in claim 4, wherein the stabilized elevation device comprises a motor, a gyro and a resolver so as to control the elevation axis of the incidence surface mirror seat.

6. The periscope as claimed in claim 4, wherein the stabilized azimuth device comprises a motor, a gyro and a resolver so as to control the azimuth axis of the incidence surface mirror seat and moreover gears to drive a derotation prism.

7. The periscope as claimed in claim 1, wherein between the reflection module and the splitters, a crosshair and a derotation prism are provided.

8. The periscope as claimed in claim 1, wherein the splitters comprise an IR sight device composed of an IR beam splitter, IR relay lens, an IR reflection mirror and an IR imager.

9. The periscope as claimed in claim 1, wherein the splitters comprise a visible light device composed of visible light splitter, visible light relay lens, reflection mirror and CCD camera.

10. The periscope as claimed in claim 1, wherein the splitters comprise a laser reflection polarized beam splitter, filters, a laser reflection mirror and a laser range finder.

* * * * *